(12) United States Patent
Rafii et al.

(10) Patent No.: US 11,257,023 B1
(45) Date of Patent: Feb. 22, 2022

(54) ENHANCED DELIVERY OPTION INTERFACES

(71) Applicant: Amazon Technologies, Inc., Seattle, WA (US)

(72) Inventors: Ilene Rafii, Seattle, WA (US); Kristen Yagley, Seattle, WA (US); Jason Rudmann, Spokane, WA (US); Jason Shim, Seattle, WA (US); Jose Ramon Algara Allegre, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 116 days.

(21) Appl. No.: 16/713,162

(22) Filed: Dec. 13, 2019

(51) Int. Cl.
*G06F 3/0482* (2013.01)
*G06Q 10/08* (2012.01)
*H04W 4/029* (2018.01)
*H04L 67/52* (2022.01)

(52) U.S. Cl.
CPC ......... *G06Q 10/083* (2013.01); *G06F 3/0482* (2013.01); *G06Q 10/087* (2013.01); *H04L 67/18* (2013.01); *H04W 4/029* (2018.02)

(58) Field of Classification Search
CPC .. G06Q 10/083; G06Q 10/087; G06F 3/0482; H04L 67/18
See application file for complete search history.

(56) References Cited

U.S. PATENT DOCUMENTS

| | | | | |
|---|---|---|---|---|
| 7,860,738 B2 * | 12/2010 | Simon | ............. | G06Q 10/06315 705/7.13 |
| 9,195,959 B1 * | 11/2015 | Lopez | ................. | G06Q 10/087 |
| 2002/0147654 A1 * | 10/2002 | Kraisser | ............. | G06Q 10/0631 705/330 |
| 2012/0089531 A1 * | 4/2012 | Klingenberg | ........ | G06Q 20/203 705/330 |
| 2013/0091070 A1 * | 4/2013 | Barron | ................... | G06Q 30/02 705/333 |
| 2013/0212034 A1 * | 8/2013 | Briggman | .......... | G06Q 10/0833 705/333 |
| 2014/0330741 A1 * | 11/2014 | Bialynicka-Birula | ...................... | G06Q 10/0838 705/341 |
| 2015/0227882 A1 * | 8/2015 | Bhatt | ............... | G06Q 10/08355 705/330 |
| 2015/0294262 A1 * | 10/2015 | Nelson | ................. | G06Q 10/083 705/330 |
| 2017/0308850 A1 * | 10/2017 | Roush | ................ | G06Q 10/0836 |

(Continued)

*Primary Examiner* — Andrea C Legget
(74) *Attorney, Agent, or Firm* — Eversheds Sutherland (US) LLP

(57) ABSTRACT

Devices, systems, and methods are provided for enhancing delivery option user interfaces. A method may include receiving, at a first device and at a first time, a delivery request from a second device, and determining a location for the delivery request. The method may include determining, based on the first time and the location, a first available delivery time window and a second available delivery time window, each having respective start and end times. The method may include facilitating presentation of first interface data and second interface data at the second device, including a first indication that a third available delivery time window associated with a no-charge delivery begins at the first time and ends at the second end time, and including a second indication of the first available delivery time window.

20 Claims, 13 Drawing Sheets

(56) References Cited

U.S. PATENT DOCUMENTS

| | | | |
|---|---|---|---|
| 2017/0323545 A1* | 11/2017 | Gillen | G06Q 50/30 |
| 2019/0012640 A1* | 1/2019 | Ferguson | G06Q 10/083 |
| 2020/0210951 A1* | 7/2020 | Perez | G06Q 10/0838 |
| 2021/0097590 A1* | 4/2021 | Canseco | G06N 3/0445 |

* cited by examiner

Delivery Schedule 404

Current Time 406: 10:15 AM

Delivery to Address: 123 ABC Street, City, State, Zip — 408

Pick-Up Location: 456 DEF Street, City, State, Zip — 410

— 412

| Today | Tomorrow | Next Date |

Next Available Delivery 414:
- Within 60 Minutes: $7.99 — 415
- 12:00 PM – 1:00 PM: $3.99
- Before 2:00 PM: FREE 2-Hour Delivery Options 416:
- 2:00 PM – 4:00 PM: FREE
- 4:00 PM – 6:00 PM: FREE
- 6:00 PM – 8:00 PM: FREE 1-Hour Delivery Options 418:
- 1:00 PM – 2:00 PM: $1.99
- 2:00 PM – 3:00 PM: $1.99
- 3:00 PM – 4:00 PM: $1.99

Delivery Schedule 434

Current Time 406: 10:15 AM

| Delivery to Address: 123 ABC Street, City, State, Zip | 408 | Pick-Up Location: 456 DEF Street, City, State, Zip | 410 |

412

| Today | Tomorrow | Next Date |

Next Available Delivery 414:

415

| Within 60 Minutes: | $7.99 |
| 12:00 PM – 1:00 PM: | $3.99 |
| Before 2:00 PM: | FREE |

1-Hour Delivery Options 418:

| 1:00 PM – 2:00 PM: | $1.99 |
| 2:00 PM – 3:00 PM: | $1.99 |
| 3:00 PM – 4:00 PM: | $1.99 |

2-Hour Delivery Options 416:

| 2:00 PM – 4:00 PM: | FREE |
| 4:00 PM – 6:00 PM: | FREE |
| 6:00 PM – 8:00 PM: | FREE |

ENHANCED DELIVERY OPTION INTERFACES

BACKGROUND

People increasingly are using online shopping to purchase items. User interfaces that present information for online shopping can vary and be confusing or undesirable. The user interfaces that present product delivery options to online shoppers may provide a variety of delivery options. However, not all delivery options may be desirable to a given shopper, and some delivery options may be difficult to understand and differentiate from one another. Therefore, there is a need for improved delivery option interfaces in computer-based commerce.

BRIEF DESCRIPTION OF THE DRAWINGS

FIG. 4A illustrates an example delivery option interface, in accordance with one or more example embodiments of the present disclosure.

FIG. 4B illustrates an example delivery option interface, in accordance with one or more example embodiments of the present disclosure.

Figure 1:
FIG. 1 illustrates example delivery option interfaces, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Overview

Example embodiments described herein provide certain systems, methods, and devices for providing enhanced delivery option interfaces.

When an online shopper is ready to purchase items, a device of the online shopper may present one or more user interfaces (e.g., graphical user interfaces) that display information such as the items that the user has requested to purchase, a delivery address, a store and/or pick-up address (e.g., procurement address), a cost of the items, available delivery dates and times for delivery of the items to the delivery address, and cost of the delivery of the items to the delivery address (e.g., delivery cost and other related information may be referred to as sales parameters). Sometimes, multiple delivery dates and times may be available based on the delivery address. To organize delivery options, a computer system may divide times of day into time windows that represent the available delivery time windows during which items may be delivered to a selected delivery address. For example, a delivery time window may have a start time of 12:00 PM and an end time of 1:00 PM, meaning that items may be delivered between 12:00 PM and 1:00 PM. Delivery time windows may be of any length of time, and some delivery times may overlap with other delivery time windows (e.g., a delivery time window of 12:00 PM-1:00 PM may overlap with a delivery time window of 12:30 PM-1:00 PM). The use of different delivery time windows may allow a shopper and a delivery service to coordinate when items may be delivered, providing predictability and assurance to a shopper, and allowing delivery services to coordinate when delivery transportation may be available and at what cost.

The cost of delivery during any delivery time window may depend on one or more factors, such the distance from the pick-up location to the delivery location, traffic, supply and demand of deliverers, the quantity of items delivered (e.g., the number of items, the size of the items, the price of the items, etc.), how quickly the items are to be delivered (e.g., the amount of time from the request to purchase to the start time of a delivery window), and the like. For example, delivery time windows that begin immediately or closer to a current time may cost more than delivery time windows that begin later. Smaller windows of time may be more expensive than larger windows of time, and windows during less trafficked times and/or when other deliveries are occurring nearby a delivery address may be more expensive than windows during heavier traffic and/or when fewer delivers are in the area of the delivery address.

Some delivery time windows may be free of charge (e.g., no-charge delivery) based on one or more factors, such as the items purchased (e.g., whether the cost, size, number, or weight of one or more of the items satisfies one or more respective thresholds), whether the buyer has a paid membership or subscription, whether a delivery promotion exists, and the like. A computer system may determine available delivery time windows and their prices, and may present the delivery time windows in one or more graphical user interfaces to allow the buyer to select a delivery time window. However, because some delivery time windows may be undesirable to a given buyer, the buyer's user experience may be undermined by receiving options that the buyer is unlikely to select. Some options may be confusing to a buyer, such as when multiple delivery time windows are presented for an overlapping time period (e.g., a delivery time window of 2:00 PM-4:00 PM and a delivery time window of 3:00 PM-4:00 PM).

Therefore, user experience for online shoppers may be improved by enhancing user interfaces used to present product delivery options.

In one or more embodiments, when a customer satisfies certain criteria, an available delivery time window (e.g., a two-hour scheduled delivery window) having a start time and an end time may be presented as a delivery time window beginning at the current time and ending at the end time of the delivery time window. For example, when a next delivery time window (e.g., a delivery time window whose start time is at least as close to the current time as any other delivery time window) is free of delivery charge, and the time from the current time to the start time of the next delivery time window exceeds a threshold amount of time (e.g., thirty minutes or any other time to allow for delivery to a delivery address), the next delivery time window may be presented in a user interface as "Free," and "Before 2:00 PM" or whatever the end time is for the next delivery time window (e.g., as opposed to showing the start time and end time for the next delivery time window, the next delivery time window may be presented as allowing for delivery anytime from the current time to the end time of the next delivery time window).

In one or more embodiments, the next delivery time window may be presented as having its start time and end time or as beginning at the current time and ending at its end time. For example, when the next delivery time window is free of delivery charge and overlaps with another delivery time window that incurs a delivery charge, rather than present a "Free" next delivery time window of 12:00 PM-2:00 PM and an overlapping delivery time window of 1:00 PM-2:00 PM with a delivery charge, the next delivery time window may be presented as "Get your products before 2:00 PM" or another indication that the next delivery time window guarantees delivery by its end time, but does not require a buyer to wait for a start time to begin the next delivery time window. In this manner, a buyer may be less likely to conclude that a delivery time window of 12:00 PM-2:00 PM that is free of delivery charge is more likely to result in delivery closer to 2:00 PM than a delivery time window of 1:00 PM-2:00 PM that includes a delivery charge. Instead, the buyer may be presented with the potential of delivery occurring even before the start time of the delivery time window.

In one or more embodiments, a computer system may select and recommend a delivery time window for a given buyer. For example, given user preferences provided by the user and/or past use history (e.g., previous delivery time window selections), the computer system may present a buyer with a recommended delivery time window that the buyer is likely to accept rather than presenting the buyer with multiple delivery time windows from which a buyer has to select. In this manner, the computer system may save the buyer time from having to decide which delivery time window from among multiple delivery time windows to select. User preferences used to determine a recommended delivery time window may include specific times of day, days of the week, delivery services, sizes of delivery time windows, environmental preferences (e.g., that a user prefers delivery using certain vehicles and during less trafficked hours), promotional preferences (e.g., that a user prioritizes delivery time windows that result in credits, discounts, offers, incentives, and the like), weather, and other factors.

In one or more embodiments, a computer system may consider other incentives in combination with user preferences to select and recommend a delivery time window for a given buyer. For example, when a buyer's preferences may be satisfied by multiple delivery time windows, the computer system may consider factors such as traffic, weather, types of delivery vehicles, delivery supply and demand, commute time and distance, time needed to procure the purchased items and deliver the items, and other information to incentivize a delivery time window with the recommended delivery time window. For example, when a buyer's preference indicates delivery time windows between 6:00 PM and 10:00 PM, the recommended delivery time window may be any delivery time window within that time period based on one or more incentives, such as an incentive to deliver less during rush hour traffic, an incentive to provide multiple deliveries within a geographic area during a given delivery time window, an incentive to reduce or increase the demand for deliveries during a delivery time window, an incentive to reduce or increase the procurement that occurs at a store or other location during a delivery time window, an incentive to increase the use of a delivery service, and the like. In this manner, a computer system may meet multiple preferences of buyer, delivery services, merchants, and other parties, along with incentivizing socially responsibilities such as reducing traffic, being environmentally cautious, being sensitive to weather conditions, and the like.

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

FIG. 1 illustrates example delivery option interfaces 100, in accordance with one or more example embodiments of the present disclosure.

Referring to FIG. 1, the interfaces 100 may be presented on a device 102, and may display user interface data such as a delivery schedule 104 with delivery time windows. The user interface data presented by the interfaces 100 may include the current time 105, a delivery location 106 (e.g., a delivery address, zip code, or other area, which may be determined automatically based on device location data, previous deliveries locations, and/or user account information), selectable delivery dates 108 (e.g., today, tomorrow, the next day, or some other date), one-hour delivery options 110 (e.g., delivery time windows having a duration of one hour from their start times to their end times), and two-hour delivery options 112 (e.g., delivery time windows having a duration of two hours from their start times to their end times). The user interface data may include the delivery cost for using a delivery time window, which may be free or any cost greater than zero.

Still referring to FIG. 1, the interface 100s may be enhanced and presented on the device 102, and may display user interface data such as a delivery schedule 154 with delivery time windows. The user interface data presented by the interface 100 may include the current time 155, a delivery location 156 (e.g., a delivery address, zip code, or other area, which may be determined automatically based on device location data, previous deliveries locations, and/or user account information), selectable delivery dates 158 (e.g., today, tomorrow, the next day, or some other date), a next free delivery 160 (e.g., a next available delivery time window that is free of delivery charge and including a delivery time from the current time 155 to an end time of the delivery time window), faster/fastest delivery options 162 (e.g., faster than the next free delivery window, such as before a particular time such as the start time of the window used for the next available delivery time window, within a threshold amount of time from the current time 155, or any window that may have an end time before the end time of the next available delivery time window), one-hour delivery options 164 (e.g., delivery time windows having a duration of one hour from their start times to their end times), and two-hour delivery options 166 (e.g., delivery time windows having a duration of two hours from their start times to their end times). The user interface data may include the delivery cost for using a delivery time window, which may be free or any cost greater than zero.

Any of the delivery location 156, the delivery dates 158, and the available delivery time windows may be selectable. For example, a buyer may select the delivery location 156 to change the delivery location 156. The buyer may select the delivery dates 158 to change delivery dates (e.g., which may result in the presentation of the same or different delivery time windows having the same or different delivery costs). The buyer may select a delivery time window to use for the purchase and delivery of any items.

In one or more embodiments, when a buyer satisfies certain criteria, an available delivery time window (e.g., the 12:00 PM-2:00 PM window shown in the delivery schedule 104) having a start time of 12:00 PM and an end time of 2:00 PM may be presented in the enhanced delivery schedule 154 as a delivery time window beginning at the current time 155 and ending at the end time of the delivery time window (e.g., "Before 2:00 PM"). Because the current time 155 may be a sufficient amount of time from the start time of the 12:00 PM-2:00 PM window, and/or because the available delivery time windows may include overlapping delivery time windows of 12:00 PM-1:00 PM and 1:00 PM-2:00 PM, the 12:00 PM-2:00 PM window shown in the delivery schedule 104 may be presented as the next free delivery 160 in the enhanced delivery schedule 154, but without the start time of 12:00 PM, thereby indicating that delivery may occur before 12:00 PM (e.g., between the current time 155 and the start time of the next free delivery 160 window). For example, traffic and location information may be used to determine a commute time from a procurement location to a delivery location at a given time of day. When there is enough time, based on the commute time, for delivery to occur before the start time of the window (e.g., determining, based on the current time, a commute time to a delivery location associated with the delivery request, and determining that an amount of time between the current time and the start time of a delivery time window is greater than or equal to the commute time), the next free delivery time window may be presented as deliverable by or before the end time of the next free delivery time window.

In one or more embodiments, the device 102 may include a personal computer (PC), a smart home device, a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a Blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

Figure 2A:
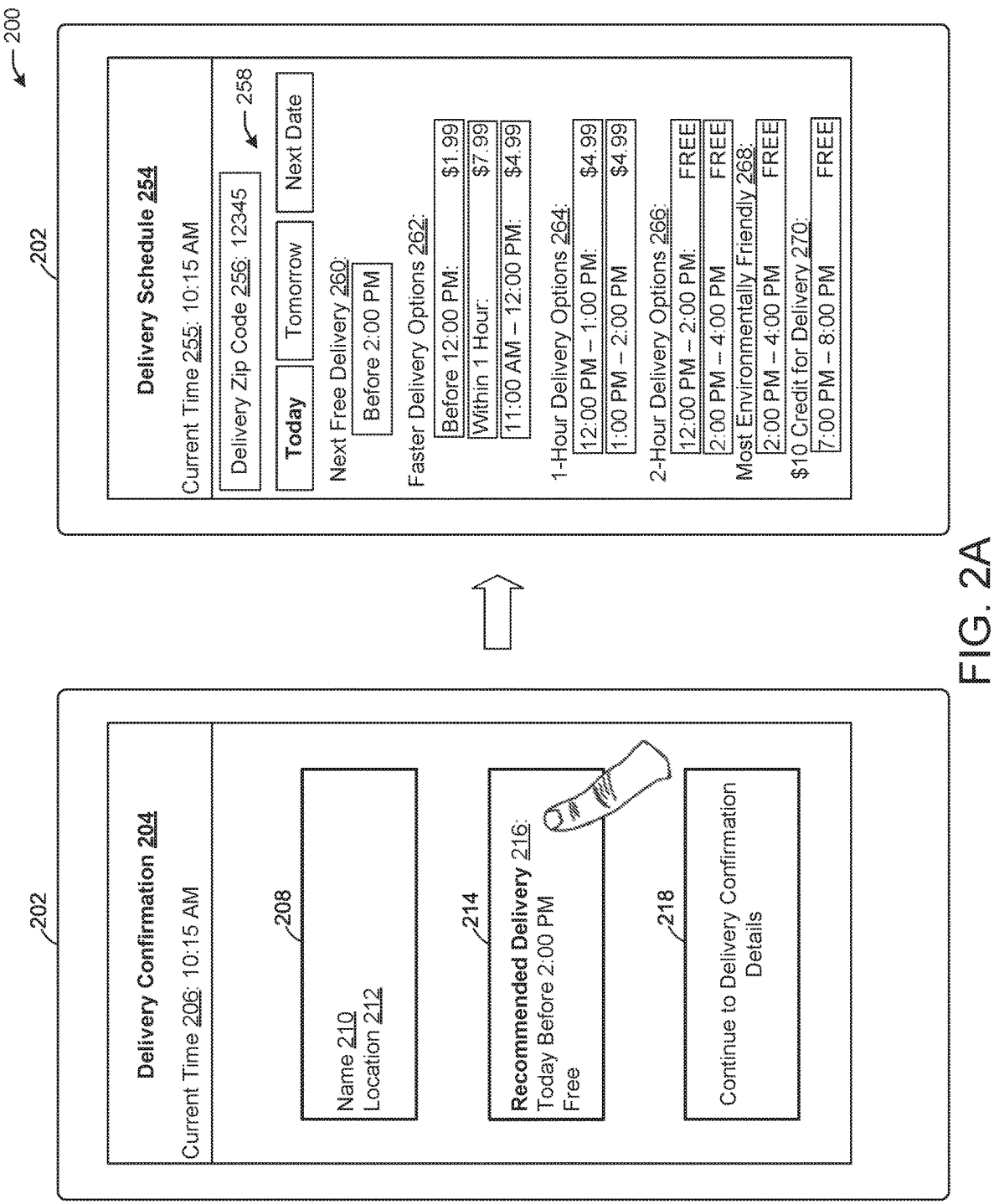
FIG. 2A illustrates example delivery option interfaces, in accordance with one or more example embodiments of the present disclosure.

FIG. 2A illustrates example delivery option interfaces 200, in accordance with one or more example embodiments of the present disclosure.

Referring to FIG. 2A, the interfaces 200 may be presented on a device 102, and may display user interface data such as delivery confirmation information 204, a current time 206, and one or more selectable indicators (e.g., selectable icons, graphics, or text), such as a recipient indicator 208 (e.g., displaying a recipient's name 210 and location 212), a recommended delivery indicator 214 (e.g., displaying a recommended delivery time window 216 with a date and time, and a cost associated with the delivery date and time), and a delivery information confirmation indicator 218 (e.g., displaying an indication that the information displayed in the other indicators is to be used in the purchase and delivery of one or more items). Any of the selectable indicators may be selected (e.g., using a touch, gesture, or other interaction) to allow a user to change the corresponding data.

Still referring to FIG. 2A, when the recommended delivery indicator 214 is selected (e.g., the recommended delivery indicator 214 may display an indication that, when selected, other delivery options are available for consideration), a user may change the delivery time window from the recommended delivery time window 216 to another available delivery time window. Upon receiving a selection of the recommended delivery indicator 214, the device 202 may display user interface data including a delivery schedule 254, which may include display of the current time 255, a delivery location 256, available delivery dates 258 (e.g., today, tomorrow, another date, etc.), a next free delivery 260 time window, even faster delivery options 262 and their respective delivery costs, one-hour delivery time options 264, two-hour delivery time options 266, and other incentivized delivery time options, such as most environmentally friendly options 268, options with offers 270 (e.g. a credit or discount for using a delivery time window), and other incentivized options (not shown). A user may select any of the available delivery options and return to the delivery confirmation 204 interface to confirm the details of purchase and delivery with the delivery information confirmation indicator 218.

In one or more embodiments, the recommended delivery 216 may be a selected time window for a given buyer. For example, given user preferences provided by the user and/or past use history (e.g., previous delivery time window selections), the recommended delivery 216 time window may be a time window that the buyer is likely to accept based on information about the buyer, such as preset preferences and/or past purchases and deliveries. User preferences used to determine a recommended delivery time window may include specific times of day, days of the week, delivery services, sizes of delivery time windows, environmental preferences (e.g., that a user prefers delivery using certain vehicles and during less trafficked hours), promotional preferences (e.g., that a user prioritizes delivery time windows that result in credits, discounts, offers, incentives, and the like), weather, and other factors.

In one or more embodiments, the recommended delivery 216 may be selected based on other incentives in combination with user preferences to select and recommend a delivery time window for a given buyer. For example, when a buyer's preferences may be satisfied by multiple delivery time windows, the recommended delivery 216 may be based on factors such as traffic, weather, types of delivery vehicles, delivery supply and demand, commute time and distance, and other information to incentivize a delivery time window with the recommended delivery time window. For example, when a buyer's preference indicates delivery time windows between 6:00 PM and 10:00 PM, the recommended delivery 216 time window may be any delivery time window within that time period based on one or more incentives, such as an incentive to deliver less during rush hour traffic, an incentive to provide multiple deliveries within a geographic area during a given delivery time window, an incentive to reduce or increase the demand for deliveries during a delivery time window, an incentive to reduce or increase the procurement that occurs at a store or other location during a delivery time window, an incentive to increase the use of a delivery service, and the like.

In one or more embodiments, the device 202 may include a personal computer (PC), a smart home device, a wearable wireless device (e.g., bracelet, watch, glasses, ring, etc.), a desktop computer, a mobile device, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a Blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

Figure 2B:
FIG. 2B illustrates example pick-up option interfaces, in accordance with one or more example embodiments of the present disclosure.

FIG. 2B illustrates example pick-up option interfaces 280, in accordance with one or more example embodiments of the present disclosure.

Referring to FIG. 2B, the interfaces 280 may be displayed on the device 202 from FIG. 2A, and may include a pick-up confirmation interface 282 with the current time 206 and the recipient indicator 208. The pick-up confirmation interface 282 may include a recommended pick-up indicator 284, which may include user interface data such as recommended pick-up time window 285, a pick-up location 286 (e.g., an address of a store where the customer may procure selected items), and a delivery cost. The pick-up confirmation interface 282 may include a pick-up information confirmation indicator 287 (e.g., displaying an indication that the information displayed in the other indicators is to be used in the purchase and procurement of one or more items). Any of the selectable indicators may be selected (e.g., using a touch, gesture, or other interaction) to allow a user to change the corresponding data.

Still referring to FIG. 2B, when the buyer selects the recommended pick-up indicator 284, the device 202 may display user interface data, including a pick-up schedule 288 interface with pick-up options for the pick-up location 286. The pick-up schedule 288 may include available pick-up windows 290, such as within an amount of time from the current time 255 and/or within time windows having respective start times and end times based on the selectable dates 258 for in-store pick-up.

Figure 3A:
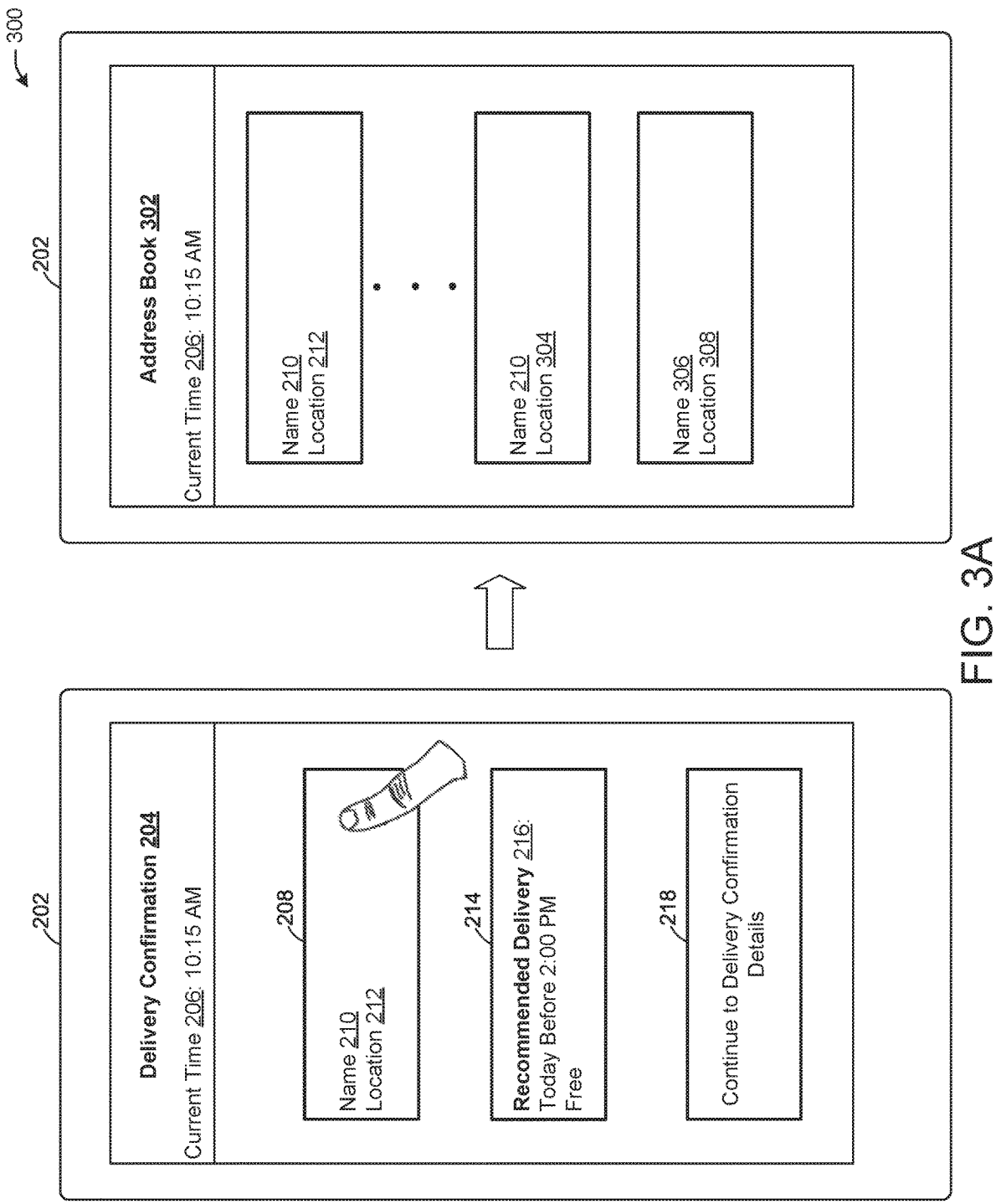
FIG. 3A illustrates example delivery option interfaces, in accordance with one or more example embodiments of the present disclosure.

FIG. 3A illustrates example delivery option interfaces 300, in accordance with one or more example embodiments of the present disclosure.

Referring to FIG. 3A, the interfaces 300 may be displayed on the device 202 from FIG. 2A, and may include the delivery confirmation 204 and other user interface data of FIG. 2A (e.g., the current time 206, the recipient indicator 208, the recommended delivery indicator 214, and the delivery information confirmation indicator 218. A user may select the recipient indicator 208 to change the name 210 and/or the delivery location 212. As shown in FIG. 3A, when the recipient indicator 208 is selected, the device 202 may present (e.g., on an another user interface) additional user interface data such as an address book 302, which may include multiple delivery locations for the name 210 (e.g., the delivery location 212, the delivery location 304), and/or additional delivery recipients (e.g., the name 306 at the delivery location 308). When a delivery name and/or location is selected from the address book 302, the recommended delivery indicator 214 may be replaced with the name and location selected from the address book 302.

Figure 3B:
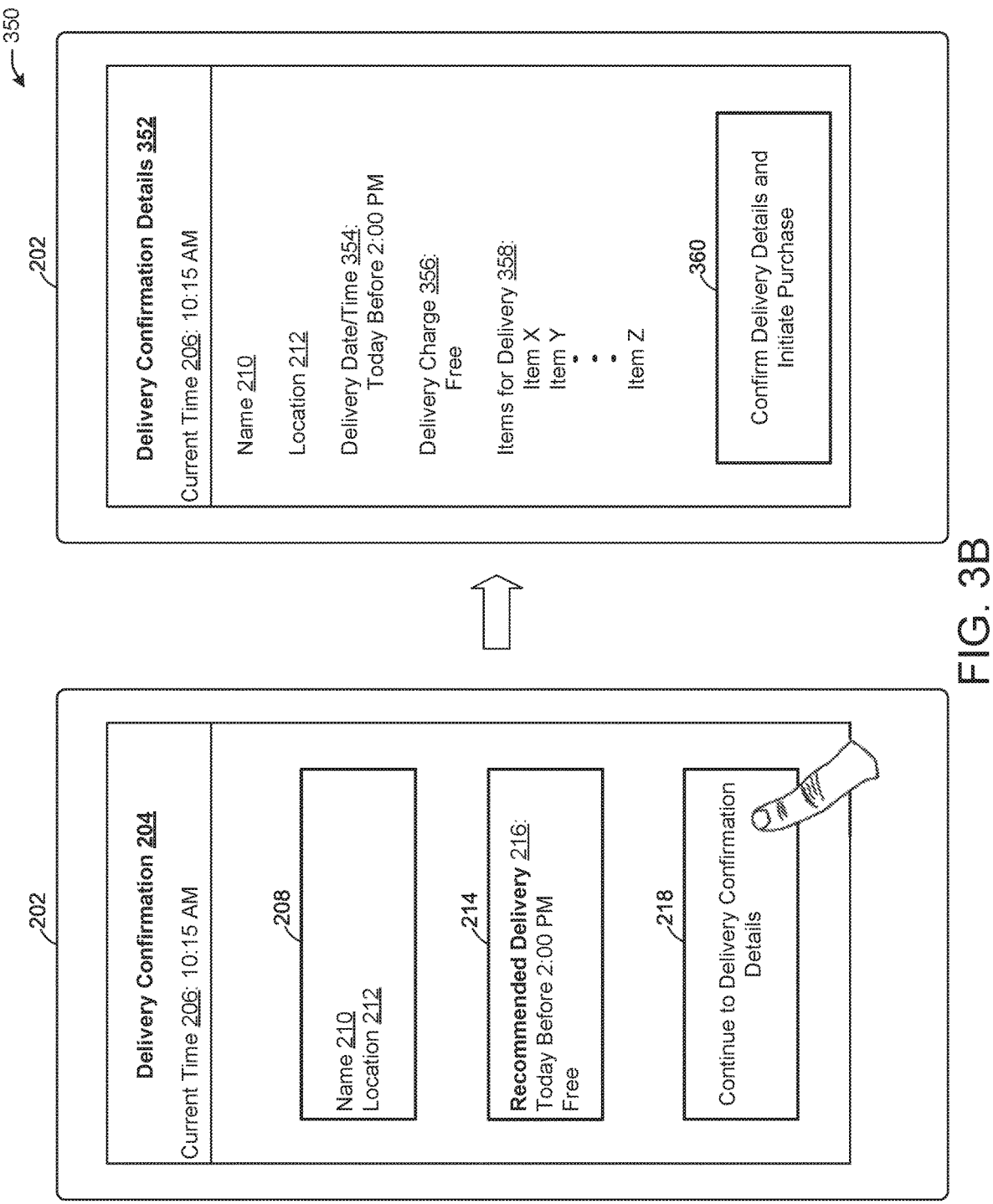
FIG. 3B illustrates example delivery option interfaces, in accordance with one or more example embodiments of the present disclosure.

FIG. 3B illustrates example delivery option interfaces 350, in accordance with one or more example embodiments of the present disclosure.

Referring to FIG. 3B, the interfaces 350 may be displayed on the device 202 from FIG. 2A, and may include the delivery confirmation 204 and other user interface data of FIG. 2A (e.g., the current time 206, the recipient indicator 208, the recommended delivery indicator 214, and the delivery information confirmation indicator 218. A user may select the delivery information confirmation indicator 218 to confirm the delivery details shown in the delivery confirmation 214 information and to proceed to initiating a transaction according to the purchase and delivery details. As shown in FIG. 3B, when the delivery information confirmation indicator 218 is selected, the device 202 may present e.g., on an another user interface) additional user interface data such as a delivery conformation details 352 interface that may present user interface data such as the current time 206, the recipient name 210, the delivery address 212, the delivery date/time 354 (e.g., as confirmed from the recommended delivery indicator 214), the delivery charge 356 (e.g., a no-charge delivery or a price for delivery that is in addition to the price for the purchase of items being delivered), the items for delivery 358 (e.g., the items that the user has selected for purchase and delivery, such as items in a virtual shopping cart), and one or more additional selectable indicators, such as a purchase and delivery confirmation submission indicator 360 that, when selected, may result in the initiation of a purchase and the scheduling of the delivery based on the selected delivery time window and price.

FIG. 4A illustrates an example delivery option interface 400, in accordance with one or more example embodiments of the present disclosure.

Referring to FIG. 4A, the interfaces 300 may be displayed on the device 402 (e.g., similar to the device 102 of FIG. 1 and the device 202 of FIG. 2A), and may include the presentation of user interface data such as a delivery schedule 404 with delivery time windows. The user interface data presented by the interface 400 may include the current time 406, a delivery location 408 (e.g., a delivery address, zip code, or other area, which may be determined automatically based on device location data, previous deliveries locations, and/or user account information), a selectable pick-up location 410 (e.g., a nearby or preferred store for in-store pick-up by the buyer in place of product delivery), selectable delivery dates 412 (e.g., today, tomorrow, the next day, or some other date), a next available delivery 414 (e.g., fastest delivery options), such as an optional next rush delivery 415 (e.g., an amount of time from the current time 406 that has an end time before the start time of other available windows), one-hour delivery options 416 (e.g., delivery time windows having a duration of one hour from their start times to their end times), and two-hour delivery options 418 (e.g., delivery time windows having a duration of two hours from their start times to their end times). The user interface data may include the delivery cost for using a delivery time window, which may be free or any cost greater than zero. The selectable delivery dates 412 may be customizable and may include an earliest date, a latest date, a range of dates (e.g., up to a certain number of days), and may include multiple options, such as a selectable calendar.

Figure 4C:
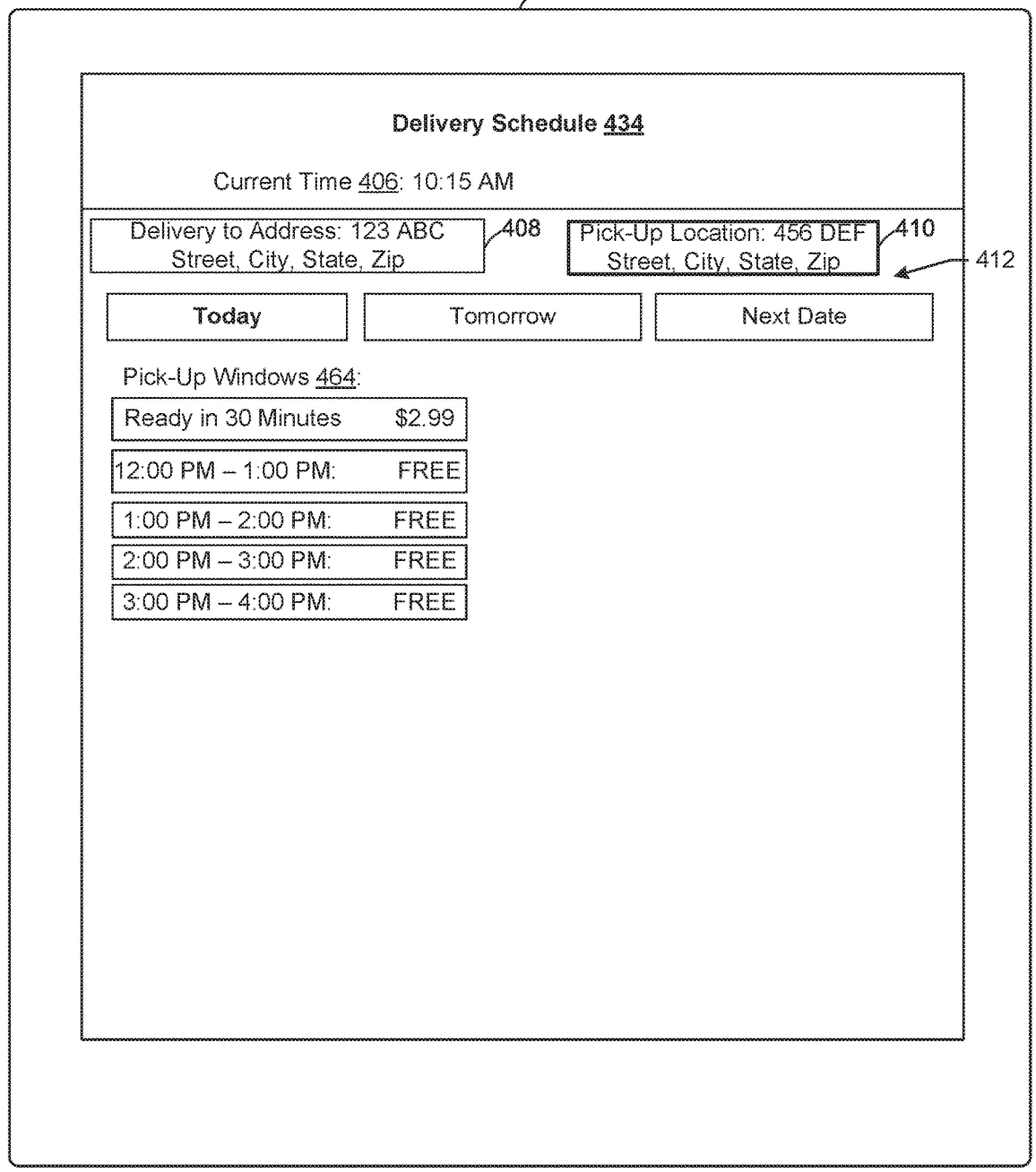
FIG. 4C illustrates an example delivery option interface, in accordance with one or more example embodiments of the present disclosure.

Any of the delivery location 408, the pick-up location 410, the delivery dates 412, and the available delivery time windows may be selectable. For example, a buyer may select the delivery location 408 to change the delivery location 408. The buyer may select the delivery dates 412 to change delivery dates (e.g., which may result in the presentation of the same or different delivery time windows having the same or different delivery costs). The buyer may select a delivery time window to use for the purchase and delivery of any items. The buyer may select the delivery location 408 or the pick-up location 410 to choose between delivery and self pick-up. The self pick-up option may allow the buyer to select the location and time as shown in FIG. 4C.

In one or more embodiments, when a buyer satisfies certain criteria, an available delivery time window (e.g., a 12:00 PM-2:00 PM window) having a start time of 12:00 PM and an end time of 2:00 PM may be presented as a delivery time window beginning at the current time 406 and ending at the end time of the delivery time window (e.g., "Before 2:00 PM"). Because the current time 406 may be a sufficient amount of time from the start time of the 12:00 PM-2:00 PM window, and/or because the available delivery time windows may include overlapping delivery time windows of 12:00 PM-1:00 PM and 1:00 PM-2:00 PM, the 12:00 PM-2:00 PM window shown in the delivery schedule 404 may be presented as "Before 2:00 PM" instead of showing the start time and end time of the delivery time window (e.g., the start time of the window is the current time 406).

FIG. 4B illustrates an example delivery option interface 430, in accordance with one or more example embodiments of the present disclosure.

The interface 430 may be displayed on a device 432 (e.g., similar to the device 402 of FIG. 4A) and may include all or some of the user interface data of the interface 400 of FIG. 4A, but in a different layout/order of information. As show, for example, the positions of the one-hour delivery options 416 and the two-hour delivery options 418 may be reversed, with the two-hour delivery options 418 shown first (e.g., above or to the left of the one-hour delivery options 416 based on the size of the display of the device 432).

FIG. 4C illustrates an example delivery option interface 460, in accordance with one or more example embodiments of the present disclosure.

When the buyer selects the pick-up location 410 of FIG. 4A or FIG. 4B (e.g., as a selection of a selectable indicator, such as a button, icon, link, or other selectable graphic), the interface 460 may be presented as another user interface displaying user interface data, including a delivery schedule 434 with pick-up options for the pick-up location 410. The delivery location 408 may be displayed as an option to return to delivery option selection (e.g., the interface 400 or the interface 430) upon selection. The delivery schedule 434 may include available pick-up windows 464, such as within an amount of time from the current time 406 and/or within time windows having respective start times and end times based on the selectable dates 412 for in-store pick-up. A buyer may select any of the pick-up windows 464 as options, and may initiate purchase and pick-up plans by providing a selectable submission (not shown, but similar to the delivery information confirmation indicator 218 of FIG. 2A).

Figure 5:
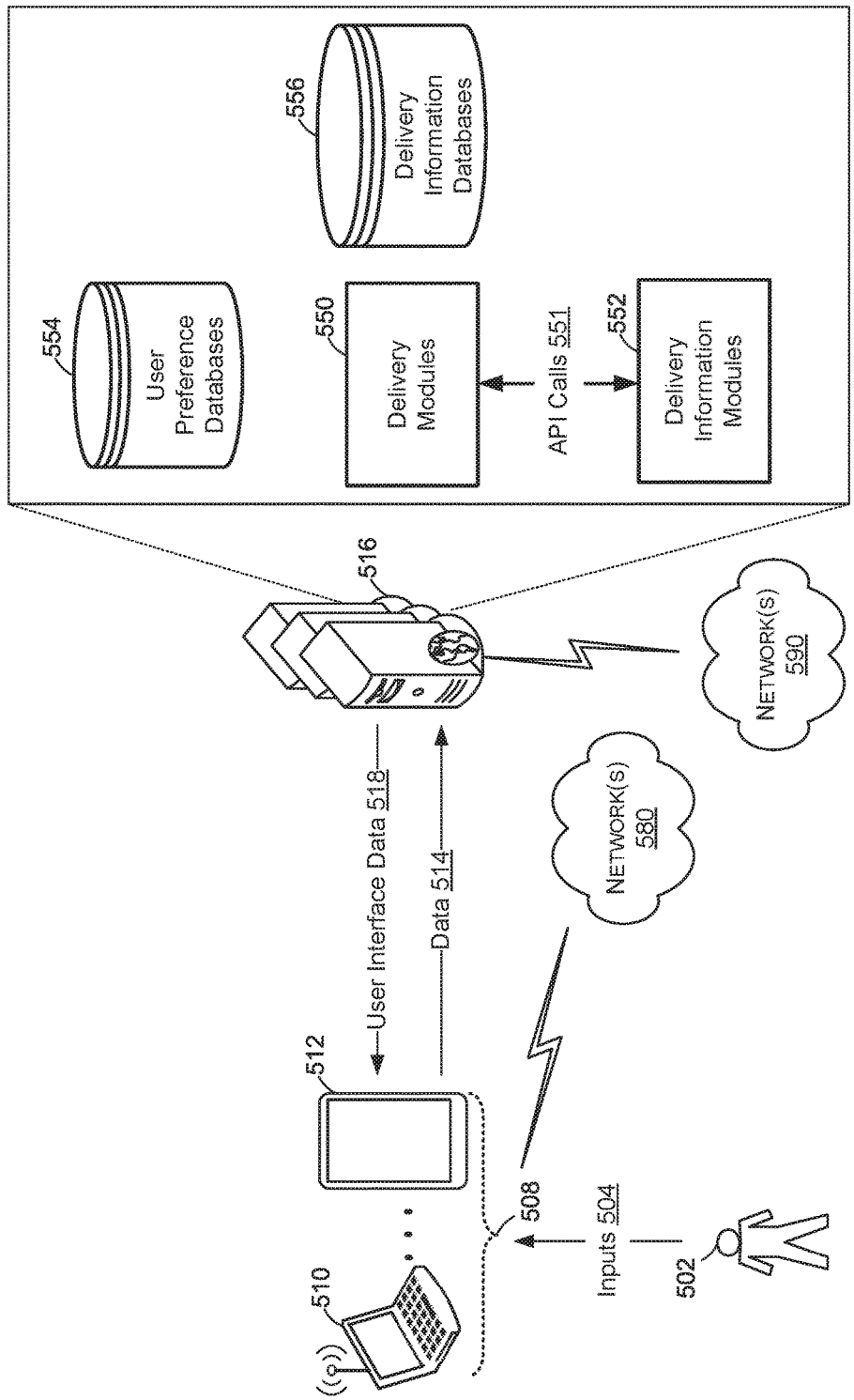
FIG. 5 illustrates an example system for providing delivery option interfaces, in accordance with one or more example embodiments of the present disclosure.

FIG. 5 illustrates an example system 500 for providing delivery option interfaces, in accordance with one or more example embodiments of the present disclosure.

Referring to FIG. 5, a user 502 (e.g., a buyer of products using an online system) may provide inputs 504 to one or more devices 508 (e.g., device 510, device 512, similar to the device 102 of FIG. 1, device 202 of FIG. 2A, device 402 of FIG. 4A, device 432 of FIG. 4B, device 462 of FIG. 4C), which may display one or more user interfaces (e.g., the interfaces 100 of FIG. 1, the interfaces 200 of FIG. 2A, the interfaces 300 of FIG. 3A, the interfaces 350 of FIG. 3B, the interface 400 of FIG. 4A, the interface 430 of FIG. 4B, the interface 460 of FIG. 4C). The inputs 504 may include touch inputs, gestures, selections (e.g., of selectable indicators, including items for purchase, delivery time windows, delivery locations, procurement locations, user preferences, payment information, and the like) which may be received via the one or more user interfaces. The one or more devices 508 may receive the inputs 504 and send data 514 (e.g., indicative of the inputs 504, user browsing and/or purchase history with user consent, user preferences, user feedback and confirmation of purchases and deliveries, and the like) to one or more remote servers 516 (e.g., cloud-based servers).

Still referring to FIG. 5, the one or more remote servers 516 may include one or more delivery modules 550, which may use the inputs 504 to determine user interface data 518 to be presented using the one or more devices 508 (e.g., by sending the user interface data 518 to the one or more devices 508 for presentation using one or more user interfaces), such as user interface data presenting indications of items to be purchased, delivery time windows and their start and end times, pick-up times, delivery and pick-up costs, delivery and pick-up addresses, and the like (e.g., as shown in the interfaces 100 of FIG. 1, the interfaces 200 of FIG. 2A, the interfaces 300 of FIG. 3A, the interfaces 350 of FIG. 3B, the interface 400 of FIG. 4A, the interface 430 of FIG. 4B, the interface 460 of FIG. 4C). The one or more delivery modules 550 may make application programming interface (API) calls 551 to one or more delivery information modules 552, which may provide information for the one or more delivery modules 550 to use in identifying available delivery time windows and their costs (along with other user interface data as described above) to be presented as the user interface data 518. The one or more delivery information modules 552 may include information modules that have access to and may provide (e.g., via the API calls 551) information such as available delivery time windows for a given location, available pick-up time windows for a given location, store hours (e.g., open and closed hours, times when delivery services are permitted to procure items for delivery from the store, etc.), restrictions (e.g., restrictions on types of items that cannot be purchased at certain dates/times, restrictions on delivery according to laws and policies, etc.), inventory (e.g., whether products are available for procurement from a given location and/or when those products may expire/perish), traffic information, weather information, environmental impact information, delivery service information, and the like. Such information may be stored in one or more delivery information databases 556. The one or more delivery modules 550 may consider user preference data (e.g., stored delivery and pick-up preferences, purchase history, etc.) stored in one or more user preference databases 554 to determine user preferences regarding delivery time windows and pick-up time windows to present and/or recommend.

In one or more embodiments, the one or more delivery modules 550 may make API calls to determine available store hours for a given procurement location, available time windows for pick-up and/or delivery given the store hours, geographical information to determine which pick-up and delivery options are available in a given geographic area, restrictions on pick-up and/or delivery items, available transportation for delivery services, and product inventory. The one or more delivery modules 550 may identify available time windows for a given pick-up or delivery and based on inventory availability of the products to be procured, available delivery services for the available time windows, and any restrictions on whether a product can be delivered or procured.

In one or more embodiments, when the user 502 satisfies certain criteria (e.g., the data 514 indicates that the items being purchased satisfy one or more thresholds or other criteria, and/or that the user 502 has a subscription, membership, or offer being exercised), an available delivery time window (e.g., a two-hour scheduled delivery window) having a start time and an end time may be selected for the user interface data 518 as a delivery time window beginning at the current time and ending at the end time of the delivery time window. For example, when a next delivery time window (e.g., a delivery time window whose start time is at least as close to the current time as any other delivery time window) is free of delivery charge, and the time from the current time to the start time of the next delivery time window exceeds a threshold amount of time (e.g., thirty minutes or any other time to allow for delivery to a delivery address), the next delivery time window may be presented in a user interface as "Free," and "Before 4:00 PM" or whatever the end time is for the next delivery time window (e.g., as opposed to showing the start time and end time for the next delivery time window, the next delivery time window may be presented as allowing for delivery anytime from the current time to the end time of the next delivery time window).

In one or more embodiments, the next delivery time window may be presented as user the interface data 518, the next delivery time window having its start time and end time or as beginning at the current time and ending at its end time. For example, when the next delivery time window is free of delivery charge and overlaps with another delivery time window that incurs a delivery charge, rather than present a "Free" next delivery time window of 10:00 AM-12:00 PM and an overlapping delivery time window of 11:00 AM-12:00 PM with a delivery charge, the next delivery time window may be presented as "Guaranteed Delivery by 12:00 PM" or another indication that the next delivery time window guarantees delivery by its end time, but does not require a buyer to wait for a start time to begin the next delivery time window.

In one or more embodiments, the one or more remote servers 516 may select and recommend a delivery time window for a given buyer. For example, given user preferences provided by the user and/or past use history (e.g., previous delivery time window selections), the one or more remote servers 516 may present a buyer with a recommended delivery time window that the buyer is likely to accept rather than presenting the buyer with multiple delivery time windows from which a buyer has to select (e.g., by providing the recommended delivery time window as the user interface data 518). In this manner, the one or more remote servers 516 may save the buyer time from having to decide which delivery time window from among multiple delivery time windows to select. User preferences used to determine a recommended delivery time window may include specific times of day, days of the week, delivery services, sizes of delivery time windows, environmental preferences (e.g., that a user prefers delivery using certain vehicles and during less trafficked hours), promotional preferences (e.g., that a user prioritizes delivery time windows that result in credits, discounts, offers, incentives, and the like), weather, and other factors.

In one or more embodiments, the one or more remote servers 516 may consider other incentives in combination with user preferences to select and recommend a delivery time window for a given buyer. For example, when a buyer's preferences may be satisfied by multiple delivery time windows, the one or more remote servers 516 may consider factors such as traffic, weather, types of delivery vehicles, delivery supply and demand, commute time and distance, and other information to incentivize a delivery time window with the recommended delivery time window. For example, when a buyer's preference indicates morning delivery time windows, the recommended delivery time window may be any morning delivery time window based on one or more incentives, such as an incentive to deliver less during rush hour traffic, an incentive to provide multiple deliveries within a geographic area during a given delivery time window, an incentive to reduce or increase the demand for deliveries during a delivery time window, an incentive to reduce or increase the procurement that occurs at a store or other location during a delivery time window, an incentive to increase the use of a delivery service, and the like. The incentives also may be stored in the one or more delivery information databases 556 as factors for the one or more delivery modules 550 to consider when determining the user interface data 518.

In one or more embodiments, the one or more devices 508 may include a personal computer (PC), a smart home device, a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a Blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

The one or more devices 508 may be configured to communicate via a communications network 580, and the one or more remote servers 516 may be configured to communicate via a communications network 590, wirelessly or wired (e.g., the same or different wireless communications networks). The communications network 580 and/or the communications network 590 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, the communications network 580, and/or the communications network 590 may have any suitable communication range associated therewith and may include, for example, global networks (e.g., the Internet), metropolitan area networks (MANs), wide area networks (WANs), local area networks (LANs), or personal area networks (PANs). In addition, the communications network 580, and/or the communications network 590 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Figure 6:
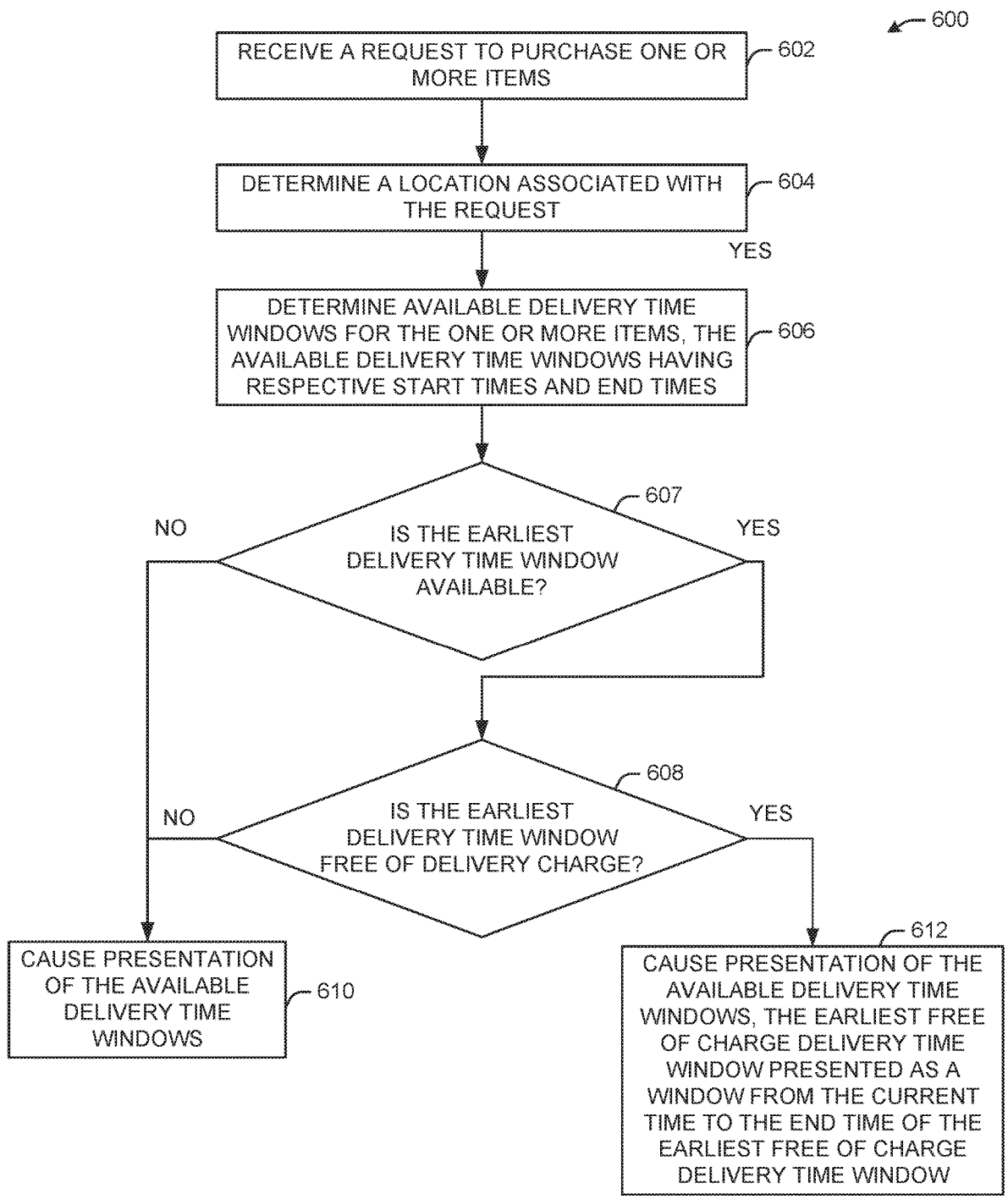
FIG. 6 illustrates a flow diagram for a process for providing delivery option interfaces, in accordance with one or more example embodiments of the present disclosure.

FIG. 6 illustrates a flow diagram for a process 600 for providing delivery option interfaces, in accordance with one or more example embodiments of the present disclosure.

At block 602, a system (or device, e.g., the one or more remote servers 516 of FIG. 5) may receive a delivery request (e.g., a purchase request) for one or more items (e.g., items submitted for purchase from a virtual shopping cart) from one or more user interfaces. For example, another device (e.g., the one or more devices 508 of FIG. 5) may provide an indication of a request to purchase items (e.g., the data 514 of FIG. 5 may include a list of items selected by a user for purchase).

At block 604, the system may determine a location associated with the request. For example, the other device may include with the request an indication of the device's location, or the system may determine a delivery location. For example, the system may select a delivery location based on a most recently used delivery location for the user who made the request, or based on a recently used delivery location for the user.

At block 606, the system may determine available delivery and/or pick-up time windows for delivering the items to the delivery address or for self pick-up. The system may make calls (e.g., the API calls 551 of FIG. 5) to one or more resources that may provide information that the system may use to determine the available delivery time windows. For example, the system may identify delivery and/or pick-up time windows, their respective start and end times, user preferences, delivery and/or pick-up restrictions, delivery transportation availability and types (e.g., vehicle types, drivers, etc.), inventory availability of the items for purchase, expiration or information indicating when items may be perishable, store hours, traffic information, weather information, and the like. The system may determine, based on the items, the current time, and the location for delivery, which delivery time windows are available and/or which pick-up times are available, and for what price (e.g., based on the items purchased, the time, the traffic, the delivery location, and the like).

At block 608, the system may determine whether the earliest available delivery time window (e.g., the delivery time window with the start time closest to and after the current time) is free of delivery charge (e.g., the system may determine a sales parameter indicative of the delivery charge or cost, which may be free). For example, when the current time is between 10:00 AM and 11:00 AM, the earliest window may begin at 11:00 AM or 12:00 PM. When the earliest window requires an extra delivery charge, the system may proceed to block 610. When the earliest window does not require an extra delivery charge, the system may proceed to block 612.

At block 610, the system may cause presentation of the available delivery time windows, including showing their start and end times. The system may generate user interface data (e.g., the user interface data 518 of FIG. 5) that includes the available delivery time windows and their start and end times, and may send the user interface data to another device (e.g., the one or more user devices 508 of FIG. 5) for presentation. The other device may receive the user interface data and may display the user interface data using one or more user interfaces (e.g., the interfaces 100 of FIG. 1, the interfaces 200 of FIG. 2A, the interfaces 300 of FIG. 3A, the interfaces 350 of FIG. 3B, the interface 400 of FIG. 4A, the interface 430 of FIG. 4B, the interface 460 of FIG. 4C). The other device may receive selections of selectable data/indicators as described above, and may select items, delivery dates, times, and locations, pick-up dates, times, and locations, and may initiate purchases, deliveries, and pick-ups using the interfaces.

Figure 7A:
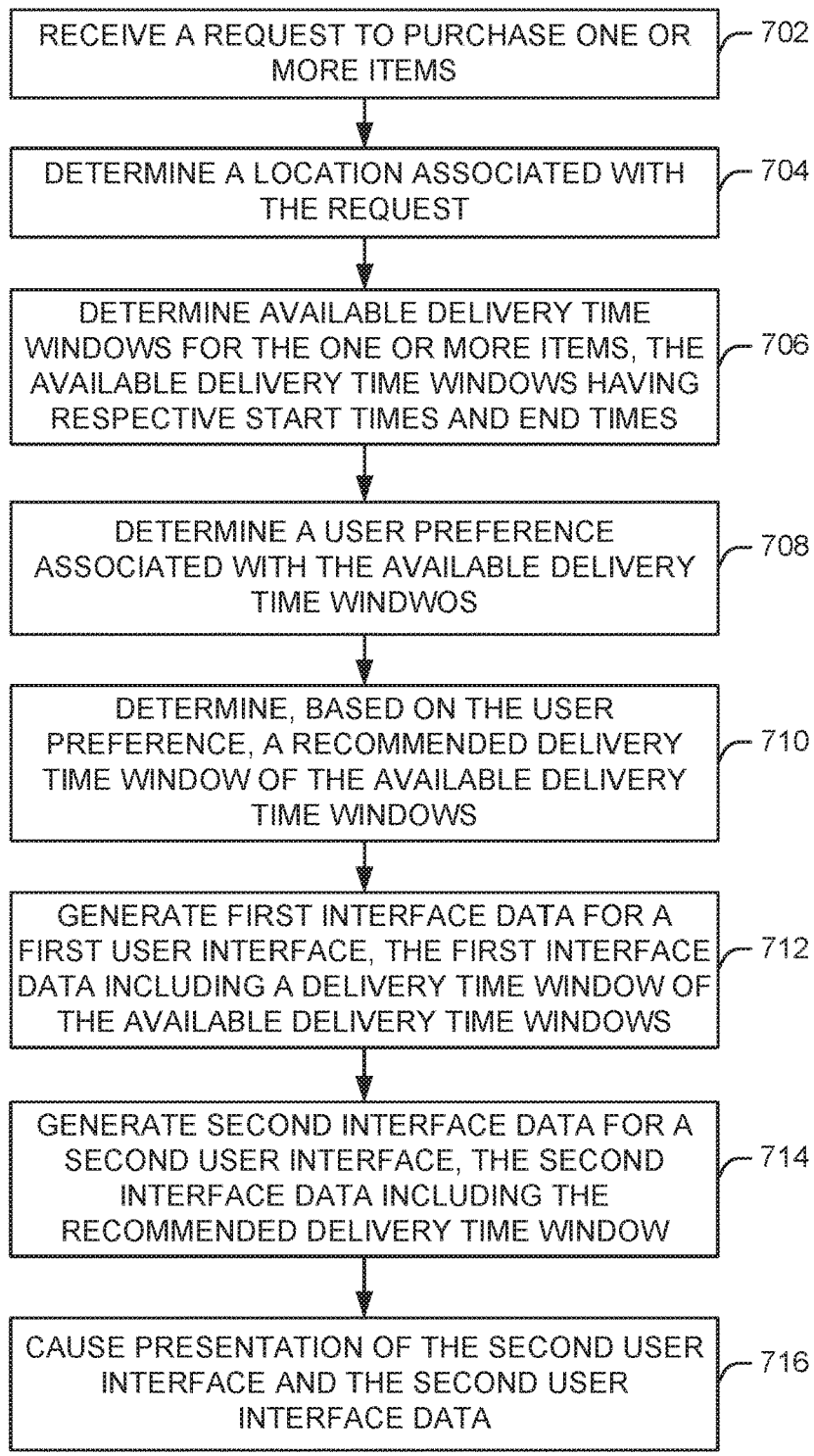
FIG. 7A illustrates a flow diagram for a process for providing delivery option interfaces, in accordance with one or more example embodiments of the present disclosure.

At block 612, the system may cause presentation of a next delivery time window as having its start time and end time or as beginning at the current time and ending at its end time (e.g., the delivery schedule 154 of FIG. 1). For example, when the next delivery time window is free of delivery charge and overlaps with another delivery time window that incurs a delivery charge, rather than present a "Free" next delivery time window of 12:00 PM-2:00 PM and an overlapping delivery time window of 1:00 PM-2:00 PM with a delivery charge, the next delivery time window may be presented as "Get your products before 2:00 PM" or another indication that the next delivery time window guarantees delivery by its end time, but does not require a buyer to wait for a start time to begin the next delivery time window. The presentation of delivery time windows may be based on user interface data generated by the system, sent to the other device, and presented by the other device using one or more user interfaces.

pick-uppick-uppick-uppick-uppick-up FIG. 7A illustrates a flow diagram for a process 700 for providing delivery option interfaces, in accordance with one or more example embodiments of the present disclosure.

At block 702, a system (or device, e.g., the one or more remote servers 516 of FIG. 5) may receive a fulfillment request (e.g., a purchase request for delivery or pick-up of items) for one or more items (e.g., items submitted for purchase from a virtual shopping cart) from one or more user interfaces. For example, another device (e.g., the one or more devices 508 of FIG. 5) may provide an indication of a request to purchase items (e.g., the data 514 of FIG. 5 may include a list of items selected by a user for purchase).

At block 704, the system may determine a location associated with the fulfillment request. For example, the other device may include with the request an indication of the device's location, or the system may determine a delivery location. For example, the system may select a delivery location based on a most recently used delivery location for the user who made the request, or based on a recently used delivery location for the user.

At block 706, the system may determine available delivery and/or pick-up time windows for delivering the items to the delivery address or for self pick-up. The system may make calls (e.g., the API calls 551 of FIG. 5) to one or more resources that may provide information that the system may use to determine the available delivery time windows. For example, the system may identify delivery and/or pick-up time windows, their respective start and end times, user preferences, delivery and/or pick-up restrictions, delivery transportation availability and types (e.g., vehicle types, drivers, etc.), inventory availability of the items for purchase, expiration or information indicating when items may be perishable, store hours, traffic information, weather information, and the like. The system may determine, based on the items, the current time, and the location for delivery, which delivery time windows are available and/or which pick-up times are available, and for what price (e.g., based on the items purchased, the time, the traffic, the delivery location, and the like).

At block 708, system may determine a user preference associated with the available time windows. For example, given user preferences provided by the user and/or past use history (e.g., previous delivery time window selections). User preferences used to determine a recommended delivery time window may include specific times of day, days of the week, delivery services, sizes of delivery time windows, environmental preferences (e.g., that a user prefers delivery using certain vehicles and during less trafficked hours), promotional preferences (e.g., that a user prioritizes delivery time windows that result in credits, discounts, offers, incentives, and the like), weather, and other factors. The user preference may be based on a current time, similar users (e.g., based on a user's location and/or purchase history), and the like.

At block 710, the system may determine a recommended a delivery time window for a given buyer. For example, given user preferences provided by the user and/or past use history (e.g., previous delivery time window selections), the computer system may present a buyer with a recommended delivery time window that the buyer is likely to accept rather than presenting the buyer with multiple delivery time windows from which a buyer has to select. Multiple available delivery time windows may satisfy user preferences, so the system may select the next available delivery time window, the next free available delivery time window, the next and cheapest delivery time window. When an available delivery time window satisfies user preferences (e.g., is within a preferred time window, below or within a price threshold, and/or uses a particular delivery service or type of vehicle, etc.), the available delivery time window may be selected as a recommended available delivery time window. Similarly, the system may select a recommended pick-up time window based on user preferences.

At block 712, the system may generate first user interface data for a first user interface (e.g., the delivery schedule 254 of the user interfaces 200 of FIG. 2A), including user interface data indicative of the available delivery time windows, their start times, their end times, their prices, and whether any incentives are associated with the delivery time windows (or pick-up time windows), such as whether the time windows are environmentally friendly, come with an offer (e.g., discount or other promotion), are during hours expected to avoid inclement weather, and the like.

At block 714, the system may generate second user interface data for a second user interface (e.g., the delivery confirmation 204 of the user interfaces 200 of FIG. 2A), including user interface data indicative of the recommended delivery time window (or recommended pick-up time window). For example, the user interface data may include selectable indicators (e.g., selectable icons, graphics, or text), such as the delivery recipient indicator, the recommended delivery indicator 214, and the delivery information confirmation indicator 218 of FIG. 2A.

At block 716, the system may cause presentation of the second user interface and second user interface data at another device (e.g., the one or more devices 508 of FIG. 5). The presentation may resemble the delivery confirmation 204 of the user interfaces 200 of FIG. 2A, where the recommended delivery time window may be represented at the other device by the recommended delivery indicator 214. When any selectable indicator is selected, the device may send an indication of the selection, and the system may respond by providing the first user interface data for the first user interface or other user interface data for one or more other user interfaces that the other device may display (e.g., the selections in FIG. 3A, FIG. 3B, FIG. 3C).

Figure 7B:
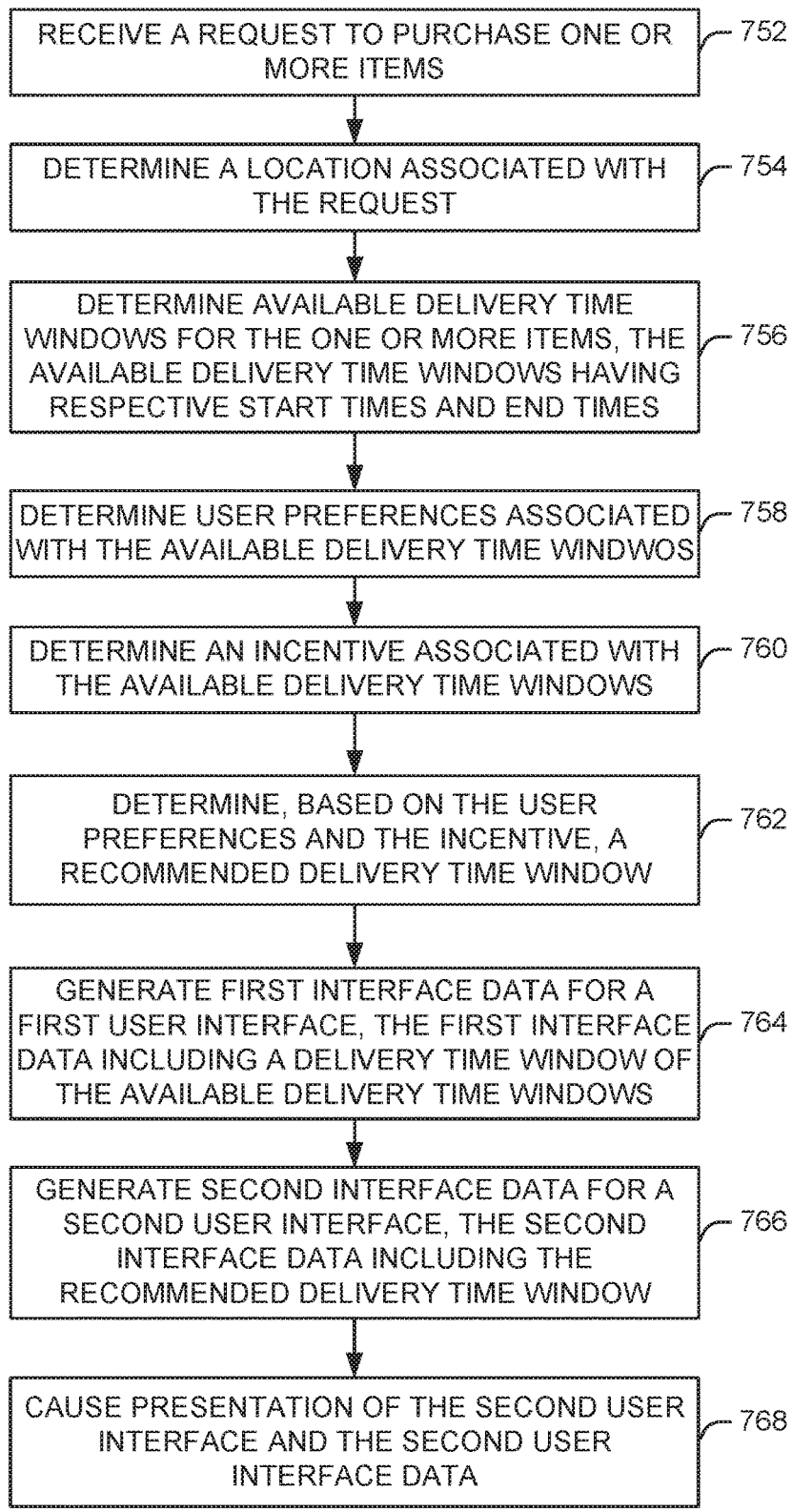
FIG. 7B illustrates a flow diagram for a process for providing delivery option interfaces, in accordance with one or more example embodiments of the present disclosure.

FIG. 7B illustrates a flow diagram for a process 750 for providing delivery option interfaces, in accordance with one or more example embodiments of the present disclosure.

At block 752, a system (or device, e.g., the one or more remote servers 516 of FIG. 5) may receive a delivery request (e.g., a purchase request) for one or more items (e.g., items submitted for purchase from a virtual shopping cart) from one or more user interfaces. For example, another device (e.g., the one or more devices 508 of FIG. 5) may provide an indication of a request to purchase items (e.g., the data 514 of FIG. 5 may include a list of items selected by a user for purchase).

At block 754, the system may determine a location associated with the request. For example, the other device may include with the request an indication of the device's location, or the system may determine a delivery location. For example, the system may select a delivery location based on a most recently used delivery location for the user who made the request, or based on a recently used delivery location for the user.

At block 756, the system may determine available delivery and/or pick-up time windows for delivering the items to the delivery address or for self pick-up. The system may make calls (e.g., the API calls 551 of FIG. 5) to one or more resources that may provide information that the system may use to determine the available delivery time windows. For example, the system may identify delivery and/or pick-up time windows, their respective start and end times, user preferences, delivery and/or pick-up restrictions, delivery transportation availability and types (e.g., vehicle types, drivers, etc.), inventory availability of the items for purchase, expiration or information indicating when items may be perishable, store hours, traffic information, weather information, and the like. The system may determine, based on the items, the current time, and the location for delivery, which delivery time windows are available and/or which pick-up times are available, and for what price (e.g., based on the items purchased, the time, the traffic, the delivery location, and the like).

At block 758, system may determine a user preference associated with the available time windows. For example, given user preferences provided by the user and/or past use history (e.g., previous delivery time window selections). User preferences used to determine a recommended delivery time window may include specific times of day, days of the week, delivery services, sizes of delivery time windows, environmental preferences (e.g., that a user prefers delivery using certain vehicles and during less trafficked hours), promotional preferences (e.g., that a user prioritizes delivery time windows that result in credits, discounts, offers, incentives, and the like), weather, and other factors.

At block 760, the system may determine one or more incentives associated with any of the available delivery time windows. Incentives may include environmental data, weather data, and other incentives such as an incentive to deliver less during rush hour traffic, an incentive to provide multiple deliveries within a geographic area during a given delivery time window, an incentive to reduce or increase the demand for deliveries during a delivery time window, an incentive to reduce or increase the procurement that occurs at a store or other location during a delivery time window, an incentive to increase the use of a delivery service, and the like. When an available delivery time window satisfies user preferences (e.g., is within a preferred time window, below or within a price threshold, uses a particular delivery service or type of vehicle, etc.) and optionally meets additional incentives, the available delivery time window may be selected as a recommended available delivery time window.

At block 762, the system may determine a recommended a delivery time window for a given buyer. For example, given user preferences provided by the user and/or past use history (e.g., previous delivery time window selections), the computer system may present a buyer with a recommended delivery time window that the buyer is likely to accept rather than presenting the buyer with multiple delivery time windows from which a buyer has to select. Multiple available delivery time windows may satisfy user preferences, so the system may select the next available delivery time window, the next free available delivery time window, the next and cheapest delivery time window, or may consider the other incentives determined at block 760. When an available delivery time window satisfies user preferences (e.g., is within a preferred time window, below or within a price threshold, uses a particular delivery service or type of vehicle, etc.) and optionally meets additional incentives, the available delivery time window may be selected as a recommended available delivery time window. Similarly, the system may select a recommended pick-up time window based on user preferences and incentives.

At block 764, the system may generate first user interface data for a first user interface (e.g., the delivery schedule 254 of the user interfaces 200 of FIG. 2A), including user interface data indicative of the available delivery time windows, their start times, their end times, their prices, and whether any incentives are associated with the delivery time windows (or pick-up time windows), such as whether the time windows are environmentally friendly, come with an offer (e.g., discount or other promotion), are during hours expected to avoid inclement weather, and the like.

At block 766, the system may generate second user interface data for a second user interface (e.g., the delivery confirmation 204 of the user interfaces 200 of FIG. 2A), including user interface data indicative of the recommended delivery time window (or recommended pick-up time window). For example, the user interface data may include selectable indicators (e.g., selectable icons, graphics, or text), such as the delivery recipient indicator, the recommended delivery indicator 214, and the delivery information confirmation indicator 218 of FIG. 2A.

At block 768, the system may cause presentation of the second user interface and second user interface data at another device (e.g., the one or more devices 508 of FIG. 5). The presentation may resemble the delivery confirmation 204 of the user interfaces 200 of FIG. 2A, where the recommended delivery time window may be represented at the other device by the recommended delivery indicator 214. When any selectable indicator is selected, the device may send an indication of the selection, and the system may respond by providing the first user interface data for the first user interface or other user interface data for one or more other user interfaces that the other device may display (e.g., the selections in FIG. 3A, FIG. 3B, FIG. 3C).

The descriptions herein are not meant to be limiting.

Figure 8:
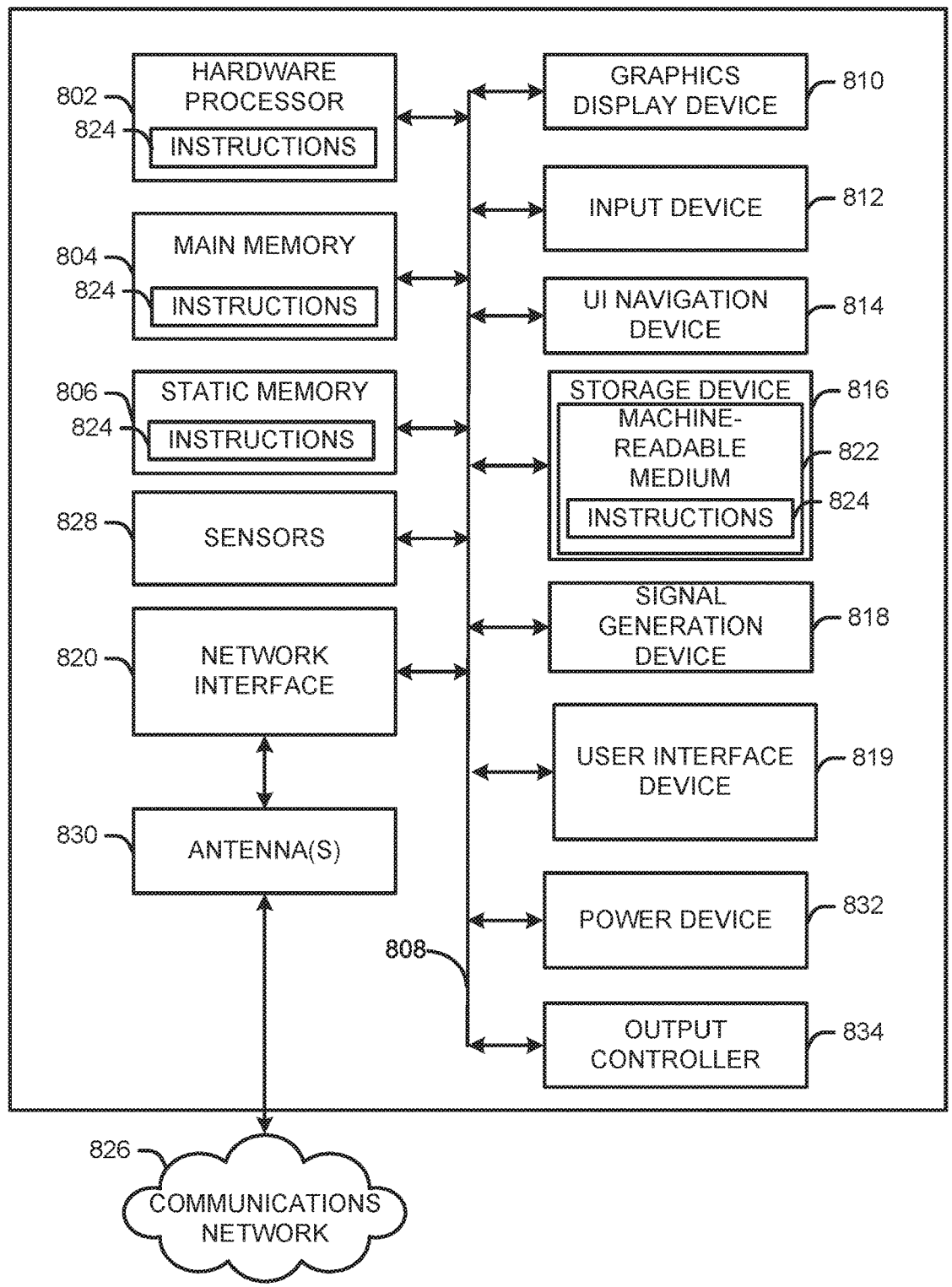
FIG. 8 illustrates a block diagram of an example machine upon which any of one or more techniques (e.g., methods) may be performed, in accordance with one or more example embodiments of the present disclosure.

FIG. 8 illustrates a block diagram of an example of a machine 800 (e.g., the device 102 of FIG. 1, the device 202 of FIG. 2A, the device 402 of FIG. 4A, the device 432 of FIG. 4B, the device 462 of FIG. 4B, the one or more devices 508 of FIG. 5, the one or more remote servers 516 of FIG. 5) or system upon which any one or more of the techniques (e.g., methodologies) discussed herein may be performed. In other embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in Wi-Fi direct, peer-to-peer (P2P), cellular, (or other distributed) network environments. The machine 800 may be a server, a personal computer (PC), a smart home device, a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a power management device 832, a graphics display device 810, an alphanumeric input device 812 (e.g., a keyboard), and a user interface (UI) navigation device 814 (e.g., a mouse). In an example, the graphics display device 810, alphanumeric input device 812, and UI navigation device 814 may be a touch screen display. The machine 800 may additionally include a storage device (i.e., drive unit) 816, a signal generation device 818, a user interface device 819, a network interface device/transceiver 820 coupled to antenna(s) 830, and one or more sensors 828, such as a microphone, a global positioning system (GPS) sensor, a compass, an accelerometer, or other sensor. The machine 800 may include an output controller 834, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within the static memory 806, or within the hardware processor 802 during execution thereof by the machine 800. In an example, one or any combination of the hardware processor 802, the main memory 804, the static memory 806, or the storage device 816 may constitute machine-readable media.

The user interface device 819 may carry out or perform any of the operations and processes (e.g., process 600 of FIG. 6, process 700 of FIG. 7A, process 750 of FIG. 7B) described and shown above.

In one or more embodiments, the user interface device 819 may be implemented in a client device (e.g., the device 102 of FIG. 1, the device 202 of FIG. 2A, the device 402 of FIG. 4A, the device 432 of FIG. 4B, the device 462 of FIG. 4B, the one or more devices 508 of FIG. 5) and/or in a server device (e.g., the one or more remote servers 516 of FIG. 5).

In one or more embodiments, when a customer satisfies certain criteria, an available delivery time window (e.g., a two-hour scheduled delivery window) having a start time and an end time may be presented as a delivery time window beginning at the current time and ending at the end time of the delivery time window. For example, when a next delivery time window (e.g., a delivery time window whose start time is at least as close to the current time as any other delivery time window) is free of delivery charge, and the time from the current time to the start time of the next delivery time window exceeds a threshold amount of time (e.g., thirty minutes or any other time to allow for delivery to a delivery address), the next delivery time window may be presented in a user interface as "Free," and "Before 2:00 PM" or whatever the end time is for the next delivery time window (e.g., as opposed to showing the start time and end time for the next delivery time window, the next delivery time window may be presented as allowing for delivery anytime from the current time to the end time of the next delivery time window). When the user interface device 819 is implemented in a client device, the user interface device 819 may receive and present user interface data in one or more user interfaces, including user interface data indicating available delivery time windows. When the user interface device 819 is implemented in a server device, the user interface device 819 may determine the user interface data to represent the delivery time windows.

In one or more embodiments, the next delivery time window may be presented as having its start time and end time or as beginning at the current time and ending at its end time. For example, when the next delivery time window is free of delivery charge and overlaps with another delivery time window that incurs a delivery charge, rather than present a "Free" next delivery time window of 12:00 PM-2:00 PM and an overlapping delivery time window of 1:00 PM-2:00 PM with a delivery charge, the next delivery time window may be presented as "Get your products before 2:00 PM" or another indication that the next delivery time window guarantees delivery by its end time, but does not require a buyer to wait for a start time to begin the next delivery time window. In this manner, a buyer may be less likely to conclude that a delivery time window of 12:00 PM-2:00 PM that is free of delivery charge is more likely to result in delivery closer to 2:00 PM than a delivery time window of 1:00 PM-2:00 PM that includes a delivery charge. Instead, the buyer may be presented with the potential of delivery occurring even before the start time of the delivery time window. When the user interface device 819 is implemented in a client device, the user interface device 819 may receive and present user interface data in one or more user interfaces, including user interface data indicating available delivery time windows. When the user interface device 819 is implemented in a server device, the user interface device 819 may determine the user interface data to represent the delivery time windows.

In one or more embodiments, the user interface device 819 may select and recommend a delivery time window for a given buyer. For example, given user preferences provided by the user and/or past use history (e.g., previous delivery time window selections), the user interface device 819 may present a buyer with a recommended delivery time window that the buyer is likely to accept rather than presenting the buyer with multiple delivery time windows from which a buyer has to select. In this manner, the user interface device 819 may save the buyer time from having to decide which delivery time window from among multiple delivery time windows to select. User preferences used to determine a recommended delivery time window may include specific times of day, days of the week, delivery services, sizes of delivery time windows, environmental preferences (e.g., that a user prefers delivery using certain vehicles and during less trafficked hours), promotional preferences (e.g., that a user prioritizes delivery time windows that result in credits, discounts, offers, incentives, and the like), weather, and other factors.

In one or more embodiments, the user interface device 819 may consider other incentives in combination with user preferences to select and recommend a delivery time window for a given buyer. For example, when a buyer's preferences may be satisfied by multiple delivery time windows, the user interface device 819 may consider factors such as traffic, weather, types of delivery vehicles, delivery supply and demand, commute time and distance, and other information to incentivize a delivery time window with the recommended delivery time window. For example, when a buyer's preference indicates delivery time windows between 6:00 PM and 10:00 PM, the recommended delivery time window may be any delivery time window within that time period based on one or more incentives, such as an incentive to deliver less during rush hour traffic, an incentive to provide multiple deliveries within a geographic area during a given delivery time window, an incentive to reduce or increase the demand for deliveries during a delivery time window, an incentive to reduce or increase the procurement that occurs at a store or other location during a delivery time window, an incentive to increase the use of a delivery service, and the like. In this manner, a computer system may meet multiple preferences of buyer, delivery services, merchants, and other parties, along with incentivizing socially responsibilities such as reducing traffic, being environmentally cautious, being sensitive to weather conditions, and the like.

It is understood that the above are only a subset of what the user interface device 819 may be configured to perform and that other functions included throughout this disclosure may also be performed by the user interface device 819.

While the machine-readable medium 822 is illustrated as a single medium, the term "machine-readable medium" may include a single medium or multiple media (e.g., a centralized or distributed database, and/or associated caches and servers) configured to store the one or more instructions 824.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 800 and that cause the machine 800 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 824 may further be transmitted or received over a communications network 826 using a transmission medium via the network interface device/transceiver 820 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 820 may include one or more physical jacks (e.g., Ethernet, coaxial, or phone jacks) or one or more antennas to connect to the communications network 826. In an example, the network interface device/transceiver 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 800 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MIS 0) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method, comprising:
   receiving, at a first device and at a first time, a delivery request from a second device, the delivery request associated with one or more items;
   determining a first location and a second location associated with the delivery request, the first location being a pick-up location for the one or more items, and the second location being a delivery location;
   determining, based on the first time, the first location, and the second location, a first available delivery time window and a second available delivery time window, the first available delivery time window having a first start time and a first end time, the second available delivery time window associated with a no-charge delivery and having a second start time and a second end time;
   determining that the second available delivery time window is an earliest available delivery time window; and
   sending first interface data and second interface data to the second device for concurrent presentation with the first time, the first interface data comprising a first indication of a third available delivery time window associated with a no-charge delivery beginning at the first time and ending at the second end time, and the second interface data comprising a second indication of the first available delivery time window,
   wherein the third available delivery time window includes a subset of a fourth delivery time window that begins prior to the first time.

2. The method of claim 1, wherein the fourth delivery time window that begins prior to the first time is a first two-hour delivery time window, the method further comprising:
   determining the first two-hour delivery time window and a second two-hour delivery time window, the first two-hour delivery time window having a third start time prior to the first time, and the second two-hour delivery time window having a fourth start time that is after the third start time; and determining, based on the first time, the first location, and the second location, that the third available delivery time window includes at least a portion of the first two-hour delivery time window.

3. The method of claim 2, further comprising determining that the third start time of the first two-hour delivery time window is an earliest start time of available two-hour delivery time windows.

4. The method of claim 1, further comprising determining that the second start time is a threshold amount of time after the first time, wherein sending the first interface data is based on the determination that the second start time is a threshold amount of time after the first time.

5. A method, comprising:

receiving, at a first device and at a first time, a delivery request from a second device;

determining a location associated with the delivery request;

determining, based on the first time and the location, a first available delivery time window and a second available delivery time window, the first available delivery time window having a first start time and a first end time, the second available delivery time window associated with a no-charge delivery and having a second start time and a second end time; and sending first interface data and second interface data to the second device for concurrent presentation with the first time, the first interface data comprising a first indication of a third available delivery time window associated with a no-charge delivery beginning at the first time and ending at the second end time, and the second interface data comprising a second indication of the first available delivery time window, wherein the third available delivery time window includes a subset of a fourth delivery time window that begins prior to the first time.

6. The method of claim 5, wherein the fourth delivery time window that begins prior to the first time is a first two-hour delivery time window, the method further comprising:

determining the first two-hour delivery time window and a second two-hour delivery time window, the first two-hour delivery time window having a third start time, and the second two-hour delivery time window having a fourth start time that is after the third start time; and determining, based on the first time and the location, that the third available delivery time window includes at least a portion of the first two-hour delivery time window.

7. The method of claim 6, further comprising further comprising determining that the third start time of the first two-hour delivery time window is an earliest start time of available two-hour delivery time windows.

8. The method of claim 5, further comprising sending a third indication of the second available delivery time window to the second device for presentation.

9. The method of claim 5, further comprising determining that the first time is before the first start time.

10. The method of claim 9, wherein sending the first interface data to the second device is based on the determination that the first time is before the first start time.

11. The method of claim 9, wherein determining that the first time is before the first start time comprises determining that the first time is at least thirty minutes before the first start time.

12. The method of claim 9, further comprising:

determining, based on the first time, a commute time to a delivery location associated with the delivery request; and determining that an amount of time between the first time and the first start time is greater than or equal to the commute time, wherein sending the first interface data to the second device is based on the determination that the amount of time between the first time and the first start time is greater than or equal to the commute time.

13. The method of claim 5, further comprising:

determining that the first available delivery time window is a one-hour delivery time window;

determining that the second available delivery time window is a two-hour delivery time window; and determining that the first end time is the same as the second end time, wherein sending the first interface data and the second interface data to the second device is based on determining that the first end time is the second end time.

14. A system, comprising memory coupled to at least one processor, the at least one processor configured to:

receive, at a first time, a delivery request from a first device;

determine a location associated with the delivery request;

determine, based on the first time and the location, a first available delivery time window and a second available delivery time window, the first available delivery time window having a first start time and a first end time, the second available delivery time window associated with a no-charge delivery and having a second start time and a second end time; and send first interface data and second interface data to the first device for concurrent presentation with the first time, the first interface data comprising a first indication of a third available delivery time window associated with a no-charge delivery beginning the first time and ending at the second end time, and the second interface data comprising a second indication of the first available delivery time window, wherein the third available delivery time window includes a subset of a fourth delivery time window that begins prior to the first time.

15. The system of claim 14, wherein the fourth delivery time window that begins prior to the first time is a first two-hour delivery time window, and wherein the at least one processor is further configured to:

determine the first two-hour delivery time window and a second two-hour delivery time window, the first two-hour delivery time window having a third start time, and the second two-hour delivery time window having a fourth start time that is after the third start time; and determine, based on the first time and the location, that the third available delivery time window includes the first two-hour delivery time window.

16. The system of claim 14, wherein the at least one processor is further configured to send a third indication of the second available delivery time window to the first device.

17. The system of claim 14, wherein the at least one processor is further configured to determine that the first time is before the first start time.

18. The system of claim 17, wherein to send the first interface data to the first device is based on the determination that the first time is before the first start time.

19. The system of claim 17, wherein to determine that the first time is before the first start time comprises the at least one processor being further configured to determine that the first time is at least one hour before the first start time.

20. The system of claim 17, wherein the at least one processor is further configured to:
- determine, based on the first time, a commute time to a delivery location associated with the delivery request; and
- determine that an amount of time between the first time and the first start time is greater than or equal to the commute time, wherein to send the first interface data to the first device is based on the determination that the amount of time between the first time and the first start time is greater than or equal to the commute time.

\* \* \* \* \*